F. W. TAYLOR, DEC'D.
E. W. CLARK, 3D, EXECUTOR.
GRASS GROWING APPARATUS AND METHOD OF MAKING THE SAME.
APPLICATION FILED SEPT. 9, 1915.
1,171,560. Patented Feb. 15, 1916.
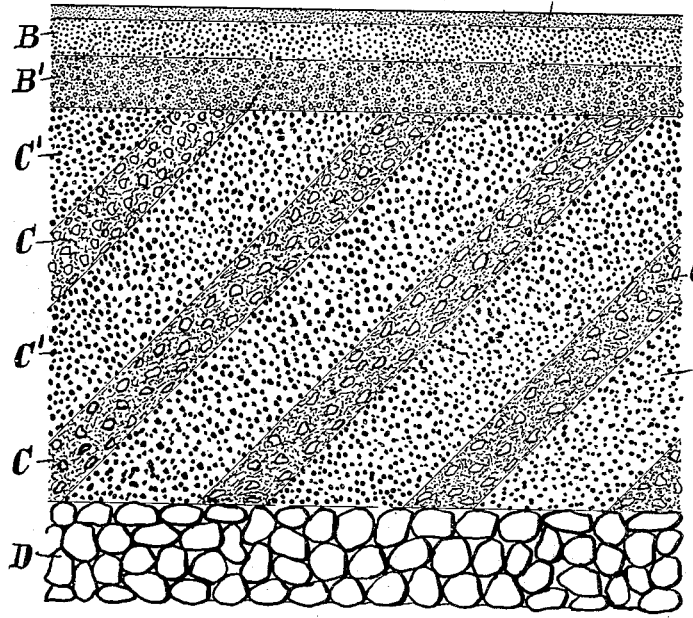
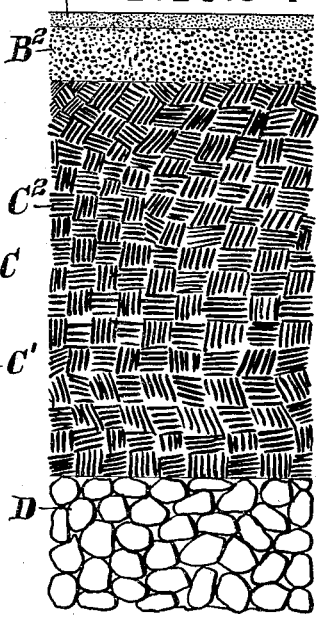
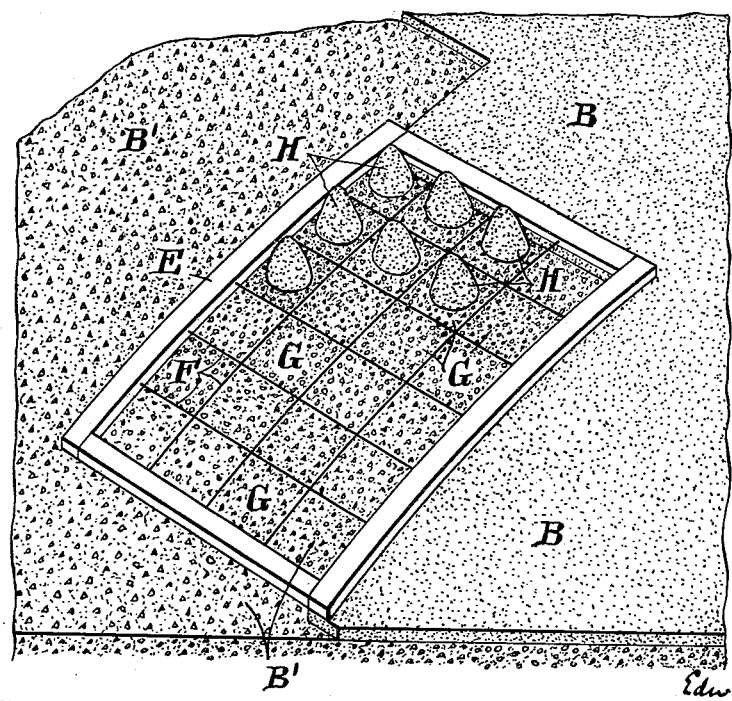

UNITED STATES PATENT OFFICE.

FREDERICK W. TAYLOR, DECEASED, LATE OF PHILADELPHIA, PENNSYLVANIA, BY EDWARD W. CLARK, 3RD, EXECUTOR, OF PHILADELPHIA, PENNSYLVANIA.

GRASS-GROWING APPARATUS AND METHOD OF MAKING THE SAME.

1,171,560. Specification of Letters Patent. Patented Feb. 15, 1916.

Application filed September 9, 1915. Serial No. 49,653.

*To all whom it may concern:*

Be it known that FREDERICK W. TAYLOR, deceased, late a citizen of the United States of America, residing in the city and county of Philadelphia, in the State of Pennsylvania, invented certain new and useful Improvements in Grass-Growing Apparatus and Methods of Making the Same, of which the following is a true and exact description, reference being had to the accompanying drawings, which form a part thereof.

The present invention consists in part of a bed of novel construction for growing grass and like vegetation, and in part in the mode or process of forming said bed.

The improved grass growing bed is especially intended and adapted for use as a putting green, and the general object of the invention is to provide a bed in which the desired growth of grass can be quickly developed and permanently maintained, and which has in addition mechanical or physical properties insuring a certain surface elasticity and degree of firmness desirable for its effect on the motion of a golf ball pitched on to the bed and which will not vary greatly with the usual climatic changes, and insuring a desirable resistance to deformation or other deterioration under the tramping and rolling to which the bed when used as a putting green is subjected by the players and in the upkeep of the green.

More specific objects of the invention are hereinafter pointed out and explained.

The invention is based primarily on the discovery that for the rapid and uniform development of a green, radically different soil conditions are necessary in the top soil layer, two inches or so thick, in which the roots of young grass live and develop, and in the subsoil beneath this layer penetrated by the roots of older grass and in which such roots receive the major portion of their food and drink. The invention is based in part also upon the discovery that for the proper rapid and uniform development of grasses and particularly such grasses as creeping bent, red fescue, Kentucky blue grass, red top, etc., which are considered best suited for use on putting greens, the seeds germinated per unit of area should be very much less numerous than is desirable and indeed practically necessary with the methods of forming greens heretofore practised. With thickly seeded greens of ordinary construction, the large number of grass plants originally germinating are reduced in number as the grass ages through the starving out of the weaker plants by the stronger. As this process is somewhat irregular and as the coarseness and rate of development of the grass is a function of the room which each plant has, there will be long periods before the grass matures into a fairly uniform and permanent condition.

By providing the proper soil conditions in accordance with the present invention and germinating the proper number of grass plants, say not more than twenty nor less than seven to the square inch, it has been found practically possible to develop a putting green in one year to a mature and fairly permanent stage of development which it has heretofore taken from three to eight years to obtain. The upper portion of the green in which the grass seed germinate and the new grass develops, should also be of such a character as to form a desirable mulch which will protect the subsoil in which the roots of the fully developed grass mainly live, against violent changes in temperature and particularly against the heat of the sun in mid-summer.

In carrying out the invention the bed is formed essentially of three layers; a top germinating layer which may be in the neighborhood of from three-sixteenths to one inch thick; a deep rooting sub-soil which may be twelve inches or so thick, and an intervening layer of from one-quarter to an inch and three-quarters in thickness in which the roots of the newly germinated grass live and grow during the first few months of the life of the green, and which, in conjunction with the germinating layer, forms a blanket in the developed green acting as a mulch to protect the sub-soil layer, and giving the upper surface of the green desirable mechanical properties, as well as forming a proper habitat for the roots of new shoots which continue to develop, though very much less rapidly, after the green is matured.

In the accompanying drawings and descriptive matter preferred bed constructions and methods of forming the same are illustrated and described.

Of the drawings: Figure 1 is a sectional elevation of one form of bed construction; Fig. 2 is a sectional elevation showing another form of body construction; and Fig. 3 is a diagrammatic view illustrating the mode employed in obtaining a uniform distribution of the blanket and germinating layer materials over the surface of the bed.

In the particular bed construction shown in Fig. 1, A represents the germinating layer; B and B' represent the two layers or strata into which the blank layer proper is divided in this form of bed construction, and the subjacent horizontal stratum composed of the inclined layers C and C' form the deep rooting sub-soil layer or stratum in which the roots of the matured grass mainly live. D represents a drainage layer of broken stones which should be provided to insure the necessary drainage in case the natural earth on which the deep rooting sub-soil stratum is placed is not sufficiently porous for this purpose. In the deep rooting sub-soil layer shown, the alternate layers C are formed to provide root receiving bodies which contain some plant food and are relatively open and porous so as to provide for ready drainage and relatively large air containing void spaces readily penetrable by the growing roots, while the intervening layers C' are formed of material richer in plant food and having a much higher water holding property with smaller individual void spaces. The layers C may advantageously be each about one and one-half inches thick and formed of eight parts of fibrous peat from the surface of forest soil mixed with one part of cow manure, while the inclined layers C' may well be three inches thick and formed with two parts of clay thoroughly mixed with one part of cow manure. The vertical depth of the stratum formed by these layers may well be about twelve inches.

A deep rooting sub-soil layer formed of inclined layers is not in itself a part of the present invention, but is described and claimed in the copending application of Frederick W. Taylor, deceased, Serial No. 669,317, filed January 4, 1912, in which such a layer and various equivalents for the compositions of the inclined layers herein disclosed are set forth.

In the modification shown in Fig. 2, the blanket layer is in the form of a single stratum $B^2$, and the deep rooting sub-soil layer $C^2$ is shown as of uniform composition from top to bottom. For a sub-soil layer $C^2$ as shown in Fig. 2, of a composition consisting of two parts of clay and one part of cow manure thoroughly mixed, and a composition consisting of equal parts of a fairly coarse sand and dried and powdered swamp muck have been found possible to give fairly satisfactory results, not equal, however, to those obtainable with the inclined layer construction of Fig. 1 which is believed to be the best form known for the purpose. It is not absolutely essential that either of the particular forms or compositions stated for the sub-soil layer should be used. It is essential to the present invention, however, that there should be a suitable sub-soil in which the roots of the matured grass may live and grow, and no natural soil has been found which will give as good results as can be obtained with artificially prepared soil layers. It is desirable, moreover, that the sub-soil layer be of such composition that it may be compacted at the time of the initial formation of the green to minimize future settling and disturbances in the green contour without interfering with the amount and character of porosity required.

In the formation of a green, after the deep rooting sub-soil stratum, whatever its composition, has been brought to the proper contour and preferably compacted, the blanket layer or layers and the germinating layer are put in place. Preferably each of these layers is well rolled after the material composing it has been put in place and distributed over the green and before the layer above it is put in place. Sample compositions and thicknesses of these layers which have been found to give excellent results in practice are as follows: For the germinating layer A, shredded peat moss, twelve parts; powdered bonemeal one part and the necessary seeds. In case creeping bent grass seed or other seeds of similar fineness are employed there will ordinarily be one part of the grass seed to about twenty-five hundred parts of the shredded peat moss and ground before mixture. The parts given in this composition, as well as those hereinafter given are by volume. The germinating layer A may well be about three-sixteenths of an inch thick. A suitable composition for the upper blanket layer B, which may vary from nine-sixteenths to one and one-sixteenth inches in thickness, consists of twelve parts of shredded peat moss, six parts of powdered limestone, and one part of powdered bone. A suitable composition for the lower blanket layer C' which may well be about three-quarters of an inch thick, consists of twelve parts of shredded peat moss, twenty-one parts of powdered limestone, five parts of cow manure, three parts of cracked bone, (pieces of one-quarter inch size) and one part of powdered bone.

The single blanket layer $C^2$ employed in Fig. 2, may be thirteen-sixteenths of an inch thick, and the composition described above for the blanket layer C' is suitable for use in this single blanket layer.

The compositions out of which the different layers are formed should be thoroughly mixed before application and should be saturated with moisture at the time they are spread over the green. In the case of the germinating layer A, the mixture should be in the condition of a free paste and in practice is actually spread with a tool similar to a mason's "float." It is one of the characteristic advantages of peat moss that it may be worked into a fluid paste or plaster for the purpose specified.

A simple, effective and relatively inexpensive method for obtaining the uniform thickness of the layers which is essential if the desired uniform growth of grass is to be had, involves the use of the spacing frame E shown in Fig. 3. This frame is sufficiently flexible to follow the contour of the putting green or other bed being formed and has wires or strings F stretched across it to divide the space within the frame up into squares G of a determined size. When this frame is put on the ground, one or more measures of the material out of which the layer being formed is made, is put in place in each square space G. These spaces are made of such a convenient size that it is a simple matter to quickly even out over them the material dumped thereon. After the material of each layer is thus put in place, the layer is thoroughly rolled, after which the upper surface of the layer, unless it be the germinating layer is roughened preparatory to putting the next layer in place. The roughening of the top surface of each layer before putting another layer in place has been found essential to insure the ready penetration of each layer by grass roots coming down from the layer above it. If the joint between the layers is left smooth there is a tendency for the grass roots to spread in the joint and not to penetrate to the lower level. Unless the joint between the germinating layer and the layer immediately beneath it are thus knit together there is danger that a heavy rain will wash and float away a large area of the peat moss of the germinating layer, especially on the slopes such as are usually found on modern putting greens.

While the compositions for the germinating and blanket layers stated have been found to give excellent results in practice it will be understood, of course, that variations in composition and thickness may be made without departing from the spirit of the invention, due regard being had to the principles hereinafter explained.

The principle constituent of the germinating layer, and indeed the only constituent other than the grass seeds which need be employed therein, is shredded peat moss and this is a most important constituent of the blanket layer or layers. Peat moss is commercially obtained at the present time from Holland, although there are large deposits in this country and elsewhere. It is gathered from swamps in thick mats and before being used in the manner described should be shredded or torn up in a grinding machine into fine hair like fibers, tangled bunches of which may still adhere slightly to one another. In the practical operation of grinding or shredding the peat moss a considerable portion of it is ground up to a more or less fine powder which is used with the shredded or fibrous portion of the ground up moss. Peat moss gives substantially better results which have been obtained with germinating and blanket layers constructed along the lines described herein. The advantages which are had with the use of this material and the properties which must characterize a substantial equivalent therefor will be apparent from the following explanation: The successful germination of the grass seeds requires the presence of air and a great deal of moisture. Shredded peat moss with its semi-fibrous nature holds just the needed quantities of air and water and provided there is a porous soil beneath it to drain the surplus water away, there is no danger if its being oversaturated. The best results have been obtained where the germinating layer is kept soaked with water all the time during the germinating period. The germinating material should do its work equally well whether it is compressed or loose on the surface of the green. Shredded peat moss is so elastic or springy that whether it be rolled or tramped down hard on the surface of the green or laid loosely (when wet) on the green, it will hold like a sponge the proper mixture of air and water around the seed and germinate in both cases about equally well. This particular property in the germinating mixture is called for because from many causes the surface of the green may be either pressed down hard or loosened up during the period of germination. It may, for instance, be walked on by men or animals or a heavy pounding rain may strike it, on the one hand, or on the other hand, puddles of water may form temporarily in certain places and loosen it up. Shredded peat moss cannot be compressed to such an extent that the young spears of grass are unable to find their way through the interstices of its fibers to the surface of the ground. And, on the other hand, even when loosened up the fibers press close enough around the seeds to enable the roots to catch on to one particle after another on their way downward. Grass roots cannot jump across an appreciable distance, though the young spears of grass require nothing to cling to and will go up through any open space. For this reason, practically every seed that germinates in this mixture forces its spear of grass to the surface while its roots find their way down to the soil beneath. In any ordinary soil great numbers of small spears of grass which are germinated die, because they are unable to force their way to the surface of the ground, or because their roots fail to find suitable openings to penetrate to the proper depth in the soil. The germinating material must hold the seeds from floating to the surface.

The fibrous nature of shredded peat moss entangles the seeds and effectually prevents them from floating to the surface and being washed away. Grass seeds are light and, like little boats, will float to the surface of many kinds of sand and soils, when a flood of water covers the surface of the green, as it sometimes does in a heavy rainstorm. The germinating layer or the upper portion of the layer beneath it should contain a plant food immediately available for the young roots to absorb. Seeds will germinate in an absolutely barren material which contains not the slightest plant food, such as crushed quartz, for instance, and the grass seed (minute as it is) contains enough plant food to supply the nutriment to the small spear of grass as it grows up and to the root as it goes down, providing the necessary moisture and air are present. Nevertheless, if the roots fail to receive plant food almost immediately, the development, both of the spear of grass and the root, will be slow and their size small, and, after exhausting the food contained in the seed, their growth will cease, although in many cases they will continue to live long after they have ceased to grow. The germinating material should be used which contains no grass or weed seeds of any kind. Almost all soils and animal manures (such as cow, horse and sheep manure) are liable to contain seeds which may germinate at the same time as the grass seeds. Both shredded peat moss and bone are, however, entirely sterile materials containing no foreign seeds whatever; and it is chiefly because bone meal is absolutely free from seeds that it is used in preference to cow manure as a plant food in the germinating layer. Powdered bone appears to be the most satisfactory plant food for the germinating layer. The grass plant develops more rapidly with this food than any other tested by the inventor, its principal advantage, however, being as stated above, that it contains no foreign seeds, as all animal manures are likely to. One part of bone meal to twelve parts of peat moss has been found to be sufficient for the germinating layer. The great disadvantage connected with the use of bone meal is that when mixed with the peat moss and the seeds it heats to as high a temperature as 140 deg. if placed in a deep pile and destroys the seeds if the heat continues for long. Almost as good results can be attained with a germinating layer of shredded peat moss and seeds containing no bone meal, when bone meal is used freely in the layer just below the germinating layer; and in view of the heating which destroys the seeds, unless the germinating layer is to be placed on the green within two days after mixing, it is better to leave out the bone meal. If bone meal is left out of the germinating layer it, of course, should be used in the blanket layer or in the top surface of the green just beneath the germinating layer. If there is sufficient time it is possible to mix the shredded peat moss and bone meal together, pile it, and after the mixture at the end of five weeks has had time to heat up and cool down again, then add the grass seeds and spread the layer on the green at leisure.

The necessity for having a definite number of spears of grass per square inch and also of the uniform distribution of the grass plants has already been referred to. It is evident that the number of spears will vary directly with the thickness of the germinating layer. Owing, therefore, to the mechanical difficulty of spreading the germinating layer to a uniform thickness all over the green, too thin a layer should be avoided, because a small variation in the thickness of a thin layer would cause a considerable variation in the spears germinated per square inch. On the other hand, if the layer is too thick seeds will be wasted, because some of the delicate spears of grass coming from the bottom of the layer will be unable to force their way to the surface. A layer three-sixteenths of an inch thick appears to be about as thin as can be uniformly and economically spread upon the green. The difficulty and expense of uniformly spreading a layer increases greatly the thinner it is. With creeping bent seeds in a three-sixteenths inch layer practically all of the spears which are germinated come to the surface. With red fescue seeds the germinating layer should be increased to from one-quarter inch to one-half inch in thickness on account of the larger size of the seeds. One red fescue seed occupies the space of seventeen creeping bent seeds; and the larger seed requires the deeper covering to keep it from floating to the surface and being carried away in a heavy rain.

Peat moss is a substance which does not decrepitate or rot away rapidly. This property of being exceedingly slow to rot makes peat moss useful for the surface of a green, because it retains its fibrous and elastic properties during the several years required for the mat of interwoven stems of the grass itself to gradually build up and form the permanent soft and elastic top for the green. The surface of the germinating layer should be soft and elastic so that the young spears of grass if walked upon will neither be crushed nor stuck fast.

In order to promote the rapid development of the grass plant from the original condition in which it consists of a single spear and a single root from a single original seed into the condition in which there are a large number of spears added to it from the roots below, it is absolutely necessary that the young grass should be mowed as early as practicable. It should not be allowed to grow more than three-quarters of an inch high, on the average, before mowing, because if allowed to grow high the moisture and food delivered from the roots will all go into the development of a few big coarse stems; while if mowed close to the ground a large number of small fresh stems must be continually added in order to use up the increasing water and food supply which comes from the roots as they develop. If germinated in the germinating layer described, and if there is a blanket layer of the right composition below the germinating layer to promote rapid and deep rooting, the young grass will (at the proper season of the year) reach the condition in which it should be mowed in about twelve to fifteen days after it shows above ground. In this condition, however, the little spears are exceedingly delicate and tender. If planted in any known kind of natural soil the young grass spears will, if walked upon, either be crushed (if the soil is dry) or will be stuck fast in the surface (if the soil is properly moist). At this stage they are not strong enough to pull themselves out of the mud and so in either case large numbers of them die. For this reason it has been looked upon as impossible to mow putting green grasses when very young. The shredded peat moss germinating mixture is so soft and elastic that even the most delicate spear of grass grown in it (those only one day old) can be walked upon without being injured. The small spur merely bends over and is pressed down into the peat moss cushion without being either crushed or stuck fast whether the surface be dry or wet.

An important advantage of a green having germinating and blanket layers formed in accordance with the present invention is that it is possible to sow the seeds in such a green when the summer heat is the greatest and when the seeds will germinate and develop most rapidly. This is not possible with greens as heretofore constructed, in localities where the summers are as warm as they are in Philadelphia, Pa., or Washington, D. C.

Perhaps the greatest misfortune that can happen to a newly planted green is a heavy deluging rain storm. If such a storm occurs at any time after planting the seeds and before the young grass roots have penetrated to a distance, say of five-eighths of an inch below the surface it will, in many cases, wash away the seeds or the young grass plants to such an extent as to make it necessary to resurface and replant the green. If, however, the roots have penetrated to a depth of five-eighths of an inch then the damage done will be comparatively small. To avoid the danger from a heavy rainstorm, however, it is important that the smallest number of days should elapse from the time the seeds are planted until the grass roots have reached a safe depth.

To insure rapid germination of the seeds and to get the young roots down quickly the germinating layer must be kept wet all the time. The newly seeded green should be watered once, and sometimes twice or three times, every day in this way, so as to keep it saturated all the time, until the roots are nearing the bottom of the blanket layer and are close to the top of the main soil of the green, when the daily watering should cease and the green should be watered for two weeks twice during the week after which it should receive a good soaking not oftener than once a week. Peat moss cannot be kept too wet and is not injured in any way by water put on it in the manner just described.

One of the incidental advantages of sowing a green in this way and caring for it so that almost every seed produces a successful grass plant which matures, is the economy in the cost of the grass seeds.

The chief function of the blanket layer is to supply the conditions required for the most rapid development of the young grass roots. The blanket layer, of course, also furnishes the moisture and food needed for the rapid growth of the stems and leaves, because there must be an even balance between the growth of the plant above and below the ground; the root development must always be proportional to the stem and leaf development. A third function of the blanket layer is to provide a soft elastic surface which will allow the ball when pitched on to the green to be checked or slowed up equally well in hot dry weather or in wet weather. The blanket layer should neither bake hard in dry hot weather nor should it grow soft and muddy after a heavy rain. It should remain about equally elastic under both of these conditions so that the ball will "bite" or bounce in approximately the same way on the green at all times. A fourth function is to furnish a surface which will not be distorted through continued freezing and thawing in winter; and still a fifth function is, as its name implies, to furnish a heavy blanket over the main body of the green which shall keep the intense heat of the summer sun from penetrating quickly into the large root bearing section of the green. A sixth function, and in some respects the most important of all, is the protection which the blanket gives to the soil beneath it from being deformed through heel marks while being mowed and watered when it is kept wet as it must be while the grass is young. In the performance of all six of these functions (with the exception of supplying the food to the grass), shredded peat moss is the ingredient of the blanket layer which plays the most important part.

In the preferred construction shown in Fig. 1 in which the blanket layer is divided into two strata the upper stratum or blanket layer B has two equally important functions: First, to promote the most rapid possible growth in the young grass roots in order that the young plants will be so deeply anchored soon after they are germinated as to be safe from being washed away in a heavy rain; and for this purpose a blanket not thinner than three-eighths of an inch is needed. Second, to provide a soft yielding surface for the ball to alight upon.

The degree of elasticity or softness required for the surface of a green is somewhat a matter of taste, although the surface of a green upon which the ball must of necessity be pitched should be softer than that of a green upon which the ball is generally run up. Almost any degree of softness can be attained by varying the thickness of the upper blanket layer. The upper blanket layer should ordinarily be from nine-sixteenths of an inch to one and one-sixteenth of an inch thick, but if greater softness is desired it can be made of any thickness greater than three-eighths of an inch. The proportion of peat moss present in the upper blanket layer, owing to its great elasticity which keeps it from being compressed, causes the roots to go down with great rapidity, first, because they have no difficulty, as they do in ordinary soils, in finding the proper opening and, second, because even with ample daily watering they are in this material still in search of water and so go down after it.

The powdered limestone providing it contains from 25 to 35 per cent. of powder fine enough to pass through a sieve 200 meshes to the inch, is a splendid moisture holder and it possesses the absolutely indispensable property of never caking or hardening when it dries out, as clay and almost all moisture holding soils do. Powdered silica rock is in some localities much cheaper than powdered limestone and is a satisfactory equivalent therefor in so far as its moisture holding and non-caking qualities are concerned. It is, however, always desirable to have a certain amount of powdered limestone present either in the upper or the lower blanket layer, so as to provide a permanent supply of lime to keep the soil below sweet. The powdered limestone or its equivalent is needed for another purpose. Shredded peat moss is exceedingly durable, and will last for years but ultimately it may decrepitate and turn into humus, in which case the powdered limestone will still provide a moisture holding body for the roots to live in.

There are several reasons for making the lower blanket layer B' differ in composition from the upper. The most important of these is that it is ordinarily desirable to make the total thickness of the blanket layer at least one and one-half inches. If a thinner layer were used, when walked upon after a heavy rain or after copious watering, the weight of a man would be enough to deform the ground beneath the blanket and therefore leave permanent irregularities in the surface of the green; whereas, one and one-half inches of an elastic blanket is sufficient to prevent this deformation. This is one of the most important functions of the blanket layer, because it allows the green to be mowed, watered and rolled properly from the start and this keeps the green uniform in texture. The grass which grows in heel marks or other depressions on a green is usually coarser than the rest. A blanket of one and one-half inches thick, consisting of peat moss twelve parts and powdered limestone six parts is too soft and elastic for a pitched ball to light upon. The ball will slow up too quickly,—possibly even embed itself in the surface in very wet weather. Therefore, the lower blanket three quarters of an inch thick is made more solid by trebling the proportion of inelastic material in it, namely; the powdered limestone. Another reason for using less peat moss in the lower blanket is that the upper blanket (12 peat moss—6 powdered limestone) is porous to a greater depth than is desirable for the best development of the roots because, while it is most important, as explained above, to induce them to grow at least five-eighths of an inch deep in the smallest possible time (to avoid wash), yet there is no special object in hurrying their downward growth beyond this point. And they permanently thrive better in the lower blanket which contains the much larger proportion of moisture holding material. The cow manure and powdered bone in the lower blanket furnish all of the quick food needed for the grass, while the cracked bone (one-quarter of an inch size) supplies food to the roots for several years. No cracked bone (one-quarter of an inch size) should ever be used closer to the surface of the ground than three-quarters of an inch. Experiments indicate that while powdered bone just below the surface is the best plant food, yet cracked bone used close to the surface is practically wasted. The roots do not use it when in this position. Below three-quarters of an inch they wrap themselves around each fragment of bone and begin to feed on it within six months.

The single layer blanket $C^2$ of Fig. 2, while giving results far superior to those which can be obtained without any blanket layer at all, is, in general, inferior to the construction shown in Fig. 1, in ways and for reasons readily understood from the foregoing explanations.

As already explained the composition of the blanket and germinating layers can be varied somewhat. For example the upper blanket layer B of Fig. 1 may be formed of shredded peat moss two parts, and cow manure one part, with or without, but preferably with one part of powdered limestone. The roots, however, do not penetrate so rapidly into a blanket layer in which the main plant food constituent is cow manure as when this constituent is pulverized bone. Extended investigation and experiments have shown no material, however, which is a practical substitute for peat moss or which will satisfactorily perform the functions or possess the advantages, of peat moss when used in the germinating and blanket layers. It will, of course, be understood that the germinating layer in addition to performing its temporary germinating function, assists the blanket layer and is really to be regarded as a part of the latter.

Having now described the invention, what is claimed as new and desired to secure by Letters Patent, is:—

1. In a root growing bed, a germinating layer consisting of a mixture of finely shredded peat moss with the seeds to be germinated.

2. In a root growing bed, a germinating layer consisting of a mixture of finely shredded peat moss with the seeds to be germinated and with a small amount of plant food.

3. In a root growing bed, a top soil consisting of a germinating layer composed of a mixture of finely shredded peat moss with the seeds to be germinated, and a layer beneath the germinating layer composed of peat moss mixed with plant food.

4. In a plant growing bed the combination with a deep rooting subsoil of a blanket layer placed thereon and consisting in substantial part of shredded peat moss.

5. In a plant growing bed the combination with a deep rooting subsoil of a blanket layer placed thereon and consisting in substantial part of shredded peat moss and also containing plant food.

6. In a plant growing bed the combination with a deep rooting subsoil of a blanket layer placed thereon and consisting in substantial part of shredded peat moss and also containing plant food and finely divided mineral matter.

7. In a plant growing bed, the combination with a deep rooting subsoil of a blanket which comprises two strata in each of which shredded peat moss is a principal constituent, the quantity of peat moss being relatively higher in the upper strata than in the lower strata and in the latter having added to it finely divided mineral matter whereby it is made more dense than the upper layer.

8. The method of seeding a bed which consists in forming a germinating mixture consisting mainly of shredded peat moss and having the seeds to be sown intimately admixed with said peat moss and spreading a thin layer of the mixture over the bed.

9. The method of seeding a bed which consists in forming a wet germinating mixture consisting mainly of shredded peat moss and having the seeds to be sown intimately admixed with said peat moss and spreading a thin plaster like layer of the mixture over the bed.

10. The method of placing a thin uniform top soil layer on a root growing bed which consists in outlining at the surface of the bed, the margins of small sections into which the surface of the bed is thereby subdivided, depositing a regulated quantity of the soil layer material on each such section of the bed and then smoothing out the deposits.

11. The method of forming on a root growing bed a top soil layer composed of strata each of which is composed in a large extent of shredded peat moss which consists in putting each stratum in place with the material composing it in a saturated condition and then without drying the layer rolling it to make it smooth and of uniform density.

EDWARD W. CLARK, 3RD.,
*Executor of the estate of Frederick W. Taylor, deceased.*